United States Patent
Liu et al.

(10) Patent No.: US 10,664,242 B2
(45) Date of Patent: *May 26, 2020

(54) APPLICATION DEVELOPMENT ENGINE AND METHOD OF PERFORMING SAME

(71) Applicant: Cybeye, Inc., Torrance, CA (US)

(72) Inventors: Bing Liu, Rollings Hills, CA (US); Hongtao Yu, Rollings Hills, CA (US); Jianfeng Wu, Torrance, CA (US)

(73) Assignee: Cybere, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,736

(22) Filed: Sep. 15, 2017

(65) Prior Publication Data
US 2018/0262862 A1 Sep. 13, 2018

Related U.S. Application Data

(63) Continuation of application No. 15/455,086, filed on Mar. 9, 2017, now Pat. No. 10,303,443.

(51) Int. Cl.
| | |
|---|---|
| *G06F 8/30* | (2018.01) |
| *H04L 29/08* | (2006.01) |
| *H04L 29/06* | (2006.01) |
| *G06Q 30/02* | (2012.01) |

(52) U.S. Cl.
CPC .......... *G06F 8/30* (2013.01); *G06Q 30/0267* (2013.01); *H04L 65/4076* (2013.01); *H04L 67/30* (2013.01); *H04L 67/34* (2013.01)

(58) Field of Classification Search
CPC .... G06F 8/20; G06F 8/30; G06F 8/34; G06Q 30/0267; H04L 65/4076; H04L 67/10; H04L 67/30; H04L 67/34; H04W 4/003; H04W 4/60

USPC ........................................ 717/100, 106–109
See application file for complete search history.

(56) References Cited

U.S. PATENT DOCUMENTS

| | | | |
|---|---|---|---|
| 7,721,259 B2 | 5/2010 | Heinke et al. | |
| 7,764,956 B2 | 7/2010 | Herberger et al. | |
| 2001/0011294 A1* | 8/2001 | Ellis, III | G06F 9/5072 709/201 |
| 2007/0168962 A1 | 7/2007 | Heinke | |
| 2008/0195997 A1 | 8/2008 | Herberger | |
| 2009/0157450 A1 | 6/2009 | Athsani | |
| 2010/0174974 A1 | 7/2010 | Brisebois | |
| 2013/0066976 A1 | 3/2013 | Massey | |
| 2013/0083906 A1* | 4/2013 | Roberts | H04N 7/147 379/88.13 |
| 2013/0247120 A1* | 9/2013 | Milgramm | H04N 21/2187 725/110 |
| 2015/0295726 A1 | 10/2015 | Bland | |
| 2016/0286244 A1* | 9/2016 | Chang | H04N 21/21805 |
| 2017/0048183 A1 | 2/2017 | Glick | |

* cited by examiner

*Primary Examiner* — Qing Chen
(74) *Attorney, Agent, or Firm* — Armstrong Teasdale LLP; Edward F. Behm, Jr.

(57) ABSTRACT

An application platform of mobile video-messaging provides a standardized and automated process for building customized applications on independent deployed platforms across various industry verticals including sport, entertainment, tourism, health, safety, education, business, and politics. The branding application platform may be used to create a plurality of different types of applications of different categories, based on needs and wants defined by an operating entity.

20 Claims, 6 Drawing Sheets

APPLICATION DEVELOPMENT ENGINE AND METHOD OF PERFORMING SAME

PRIORITY

This application is a continuation of U.S. Non-Provisional 15/455,086, filed Mar. 9, 2017, now U.S. Pat. No. 10,303,443, which claims the benefit of U.S. Provisional 62/430,480, filed Dec. 6, 2016, now expired, which are hereby incorporated by reference as if submitted in their entireties.

This application is a continuation of U.S. Non-Provisional Ser. No. 15/455,086 (now U.S. Pat. No. 10,303,443), filed Mar. 9, 2017, which is hereby incorporated by reference as if submitted in its entirety.

This application is related to U.S. Provisional 62/430,480, filed Dec. 6, 2016, which is hereby incorporated by reference as if submitted in its entirety.

This application is related to U.S. Provisional 62/413,392, filed Oct. 26, 2016, U.S. Provisional 62/430,452, filed Dec. 6, 2016, U.S. Provisional 62/430,472, filed Dec. 6, 2016, and 62/430,434, filed Dec. 6, 2016, which are hereby incorporated by reference as if submitted in its entirety.

TECHNICAL FIELD

The present invention relates to the manufacturing of mobile applications, and, more particularly, a platform for the automated generation, configuration, and deployment of mobile applications.

BACKGROUND

In the new era of App Economy 2.0, software applications, or "Apps," are quickly replacing websites as the face of businesses. The days when a few big entities dominated the Apps market will soon be gone. In the new App Economy, the market is expected to be run by many different kinds of branding Apps. Typical Apps require the employment of a developer or team of developers to create or produce a single App. Therefore, the development and deployment for a single application takes a lot of time at high expense. A typical mobile application takes 18 weeks to develop and publish a standard native mobile application at costs ranging from $3,000-$250,000.

BRIEF DESCRIPTION OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

The detailed description makes reference to the accompanying figures in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that exemplary embodiments may be embodied in different forms. As such, the exemplary embodiments should not be construed to limit the scope of the disclosure. As referenced above, in some exemplary embodiments, well-known processes, well-known device structures, and well-known technologies may not be described in detail.

The terminology used herein is for the purpose of describing particular exemplary embodiments only and is not intended to be limiting. For example, as used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on," "engaged to," "connected to," or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer, or section without departing from the teachings of the exemplary embodiments.

Figure 1:
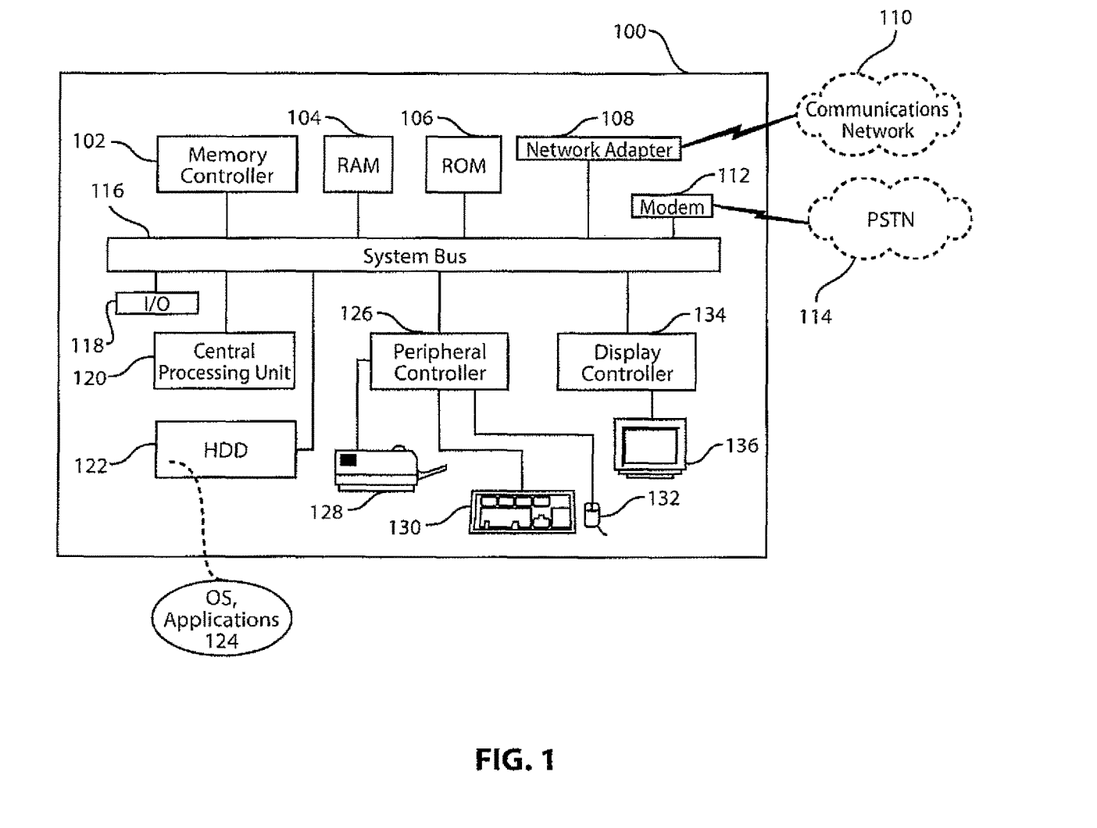
FIG. 1 illustrates an aspect of an exemplary embodiment of the present invention.

FIG. 1 illustrates an exemplary embodiment of a computer processing system 100 that may receive the various inputs as discussed herein, such as from local or remote sensors or GUIs, and that may perform the processing and logic discussed throughout. That is, the exemplary computing system 100 may be used in accordance with herein described systems and methods.

Computing system 100 is capable of executing software, such as an operating system (OS) and one or more computing applications 124. The software may likewise be suitable for operating hardware, such as via inputs/outputs (I/O), using said applications 124.

The operation of exemplary computing system 100 is controlled primarily by computer readable instructions, such as instructions stored in a computer readable storage medium, such as hard disk drive (HDD) 122, optical disk (not shown) such as a CD or DVD, solid state drive (not shown) such as a USB "thumb drive," or the like. Such instructions may be executed within central processing unit (CPU) 120 to cause computing system 100 to perform the disclosed operations. In many known computer servers, workstations, PLCs, personal computers, mobile devices, and the like, CPU 120 is implemented in an integrated circuit called a processor.

The various illustrative logics, logical blocks, modules, and engines, described in connection with the embodiments disclosed herein may be implemented or performed with any of a general purpose CPU, a digital signal processor (DSP), an application specific integrated circuit (ASIC), a field programmable gate array (FPGA) or other programmable logic device, discrete gate or transistor logic, discrete hardware components, or any combination thereof, respectively acting as CPU 120. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is appreciated that, although exemplary computing system 100 is shown to comprise a single CPU 124, such description is merely illustrative, as computing system 100 may comprise a plurality of CPUs 124. Additionally, computing system 100 may exploit the resources of remote or parallel CPUs (not shown), for example, through local or remote communications network 110 or some other data communications means.

In operation, CPU 124 fetches, decodes, and executes instructions from a computer readable storage medium, such as HDD 122. Such instructions can be included in the software, such as the operating system (OS), executable programs/applications, and the like. Information, such as computer instructions and other computer readable data, is transferred between components of computing system 100 via the system's main data-transfer path. The main data-transfer path may use a system bus architecture 116, although other computer architectures (not shown) can be used, such as architectures using serializers and deserializers and crossbar switches to communicate data between devices over serial communication paths.

System bus 116 may include data lines for sending data, address lines for sending addresses, and control lines for sending interrupts and for operating the system bus. Some busses provide bus arbitration that regulates access to the bus by extension cards, controllers, and CPU 124. Devices that attach to the busses and arbitrate access to the bus are called bus masters. Bus master support also allows multiprocessor configurations of the busses to be created by the addition of bus master adapters containing processors and support chips.

Memory devices coupled to system bus 116 can include random access memory (RAM) 104 and read only memory (ROM) 106. Such memories include circuitry that allows information to be stored and retrieved. ROMs 106 generally contain stored data that cannot be modified. Data stored in RAM 104 can generally be read or changed by CPU 124 or other communicative hardware devices. Access to RAM 104 and/or ROM 106 may be controlled by memory controller 102. Memory controller 102 may provide an address translation function that translates virtual addresses into physical addresses as instructions are executed. Memory controller 102 may also provide a memory protection function that isolates processes within the system and that isolates system processes from user processes. Thus, a program running in user mode can normally access only memory mapped by its own process virtual address space; it cannot access memory within another process' virtual address space unless memory sharing between the processes has been set up.

The steps and/or actions described in connection with the aspects disclosed herein may be embodied directly in hardware, in a software module executed by a processor locally or remotely, or in a combination of the two, in communication with memory controller 102 in order to gain the requisite performance instructions. That is, the described software modules to perform the functions and provide the directions discussed herein throughout may reside in RAM memory, flash memory, ROM memory, EPROM memory, EEPROM memory, registers, a hard disk, a removable disk, a CD-ROM, or any other form of storage medium known in the art. Any one or more of these exemplary storage medium may be coupled to the processor 124, such that the processor can read information from, and write information to, that storage medium. In the alternative, the storage medium may be integral to the processor. Further, in some aspects, the processor and the storage medium may reside in an ASIC. Additionally, in some aspects, the steps and/or actions may reside as one or any combination or set of instructions on an external machine readable medium and/or computer readable medium as may be integrated through I/O port(s) 118, such as a "flash" drive.

In addition, computing system 100 may contain peripheral controller 126 responsible for communicating instructions using a peripheral bus from CPU 124 to peripherals and other hardware, such as printer 128, keyboard 130, and mouse 132. An example of a peripheral bus is the Peripheral Component Interconnect (PCI) bus.

One or more hardware input/output (I/O) devices may be in communication with hardware controller 118. This hardware communication and control may be implemented in a variety of ways and may include one or more computer busses and/or bridges and/or routers. The I/O devices controlled may include any type of port-based hardware (and may additionally comprise software, firmware, or the like), such as the disclosed sensors and equipment inputs/outputs, and can also include network adapters and/or mass storage devices from which the computer system 100 can send and receive data for the purposes disclosed herein. The computer system 100 may thus be in communication with the Internet or other networked devices via the I/O devices and/or via communications network 110.

Display 136, which is controlled by display controller 134, may optionally be used to display visual output generated by computing system 100. Display controller 134 may also control, or otherwise be communicative with, the display. Visual output may include text, graphics, animated graphics, and/or video, for example. Display 136 may be implemented with a CRT-based video display, an LCD-based display, gas plasma-based display, touch-panel, or the like. Display controller 134 includes electronic components required to generate a video signal that is sent for display.

Further, computing system 100 may contain network adapter 108 which may be used to couple computing system 100 to an external communication network 110, which may include or provide access to the Internet, and hence which may provide or include tracking of and access to the process data discussed herein. Communications network 110 may provide user access to computing system 100 with means of communicating and transferring software and information electronically, and may be coupled directly to computing system 100, or indirectly to computing system 100, such as via PSTN or cellular network 114. For example, users may communicate with computing system 100 using communication means such as email, direct data connection, virtual private network (VPN), or other online communication services, or the like. Additionally, communications network 110 may provide for distributed processing, which involves several computers and the sharing of workloads or cooperative efforts in performing a task. It is appreciated that the network connections shown are exemplary and other means of establishing communications links between multiple computing systems 100, and/or with remote users, may be used.

It is appreciated that exemplary computing system 100 is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

Figure 2:
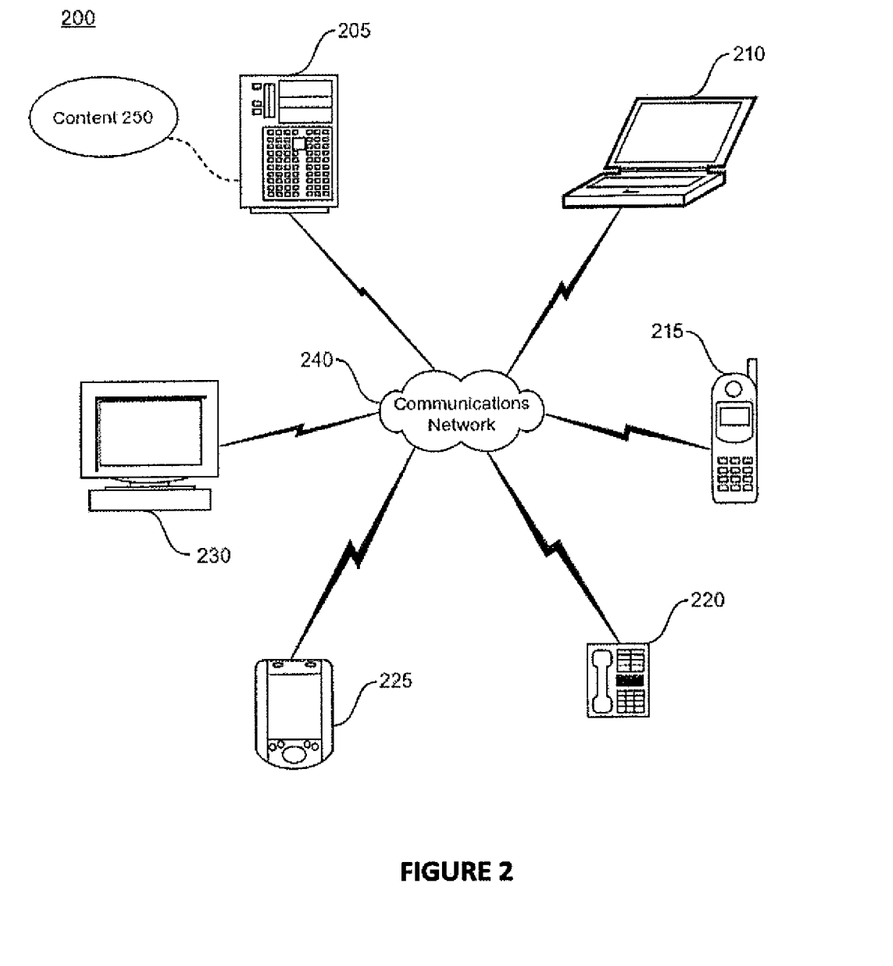
FIG. 2 illustrates an aspect of an exemplary embodiment of the present invention.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

The present invention is and includes a branding application platform provider for the automated generation, configuration, and deployment of one or more software applications for individual entities. Individual entities may include, but are not limited to, individual businesses, consumers, politicians, contest organizers, and the like. The platform provides a software application, or app, that includes, but is not limited to, interactive live streaming, real-time location tracking, instant messaging and chat features, and/or content monetization. Using the automated process of the branding application platform, a single entity may license and/or create a plurality of different applications. For example, an entity may purchase credit to have 100 apps to be developed, all with different customizable options. The disclosed invention provides support for the manufacturing of applications, the deployment, and adequate support and hosting for the applications deployed and while in use.

Figure 3:
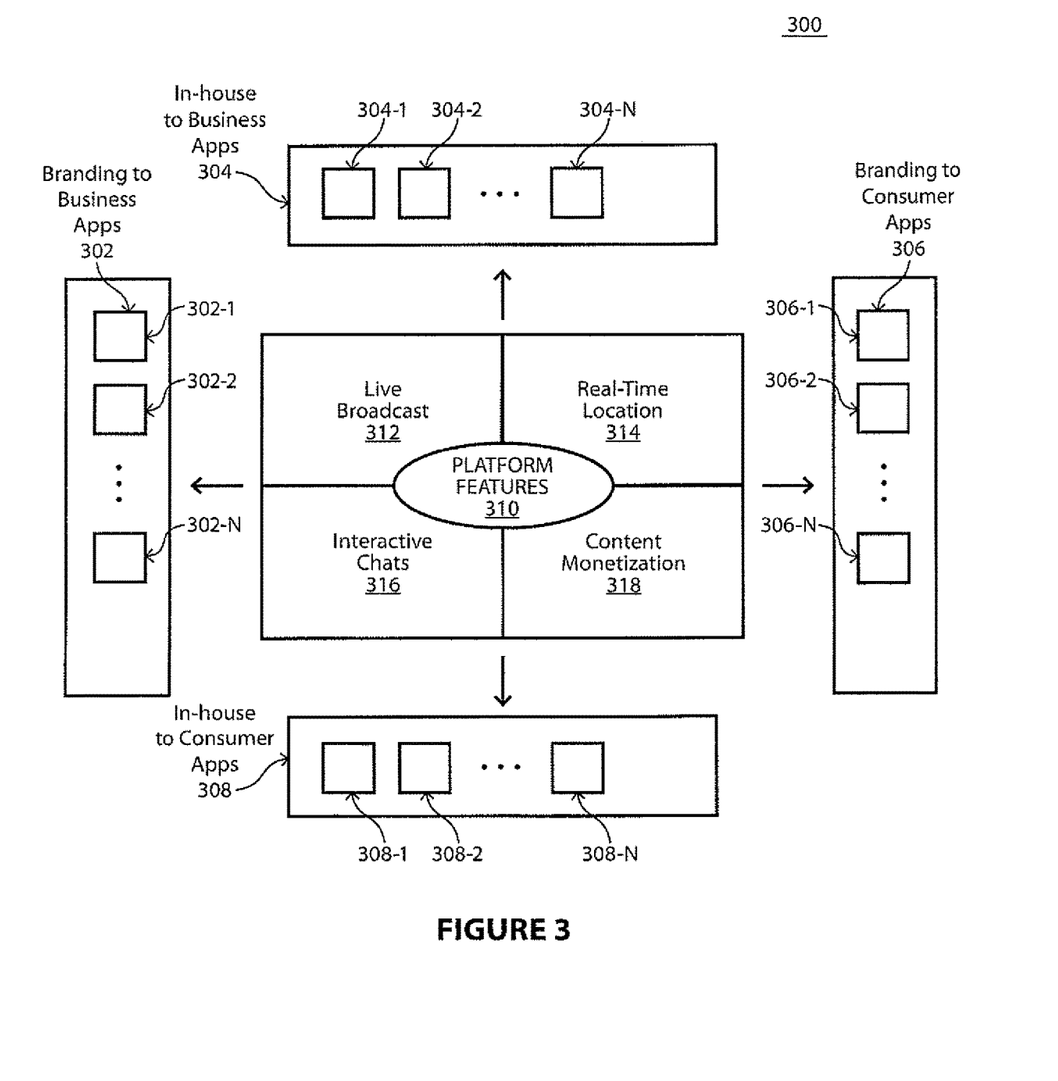
FIG. 3 is an exemplary platform overview diagram of the present invention.

FIG. 3 is an overview diagram 300 of the branding application platform provider. The branding application platform may be used to create a plurality of different types of applications of different categories, based on needs and wants defined by an operating entity. For example, applications may be categorized as Branding-to-Business applications 302 (Apps 302-1, 302-2, . . . 302-N), In-house-to-Business applications 304 (Apps 304-1, 304-2, . . . 304-N), Branding-to-Consumer applications 306 (Apps 306-1, 306-2, . . . 306-N), and/or In-house-to-Consumer applications 308 (Apps 308-1, 308-2, . . . 308-N). Each application may be created and configured to comprise one or more Platform Features 310 which serve as main modules. Each application may therefore include, but is not limited to, Live Broadcast 312, Real-Time Location 314, Interactive Chats 316, and Content Monetization 318. Platforms may be deployed through this established platform, applications may be generated, configured, and deployed in high volume, quickly, with high quality, and with optimal efficiency.

Figure 4:
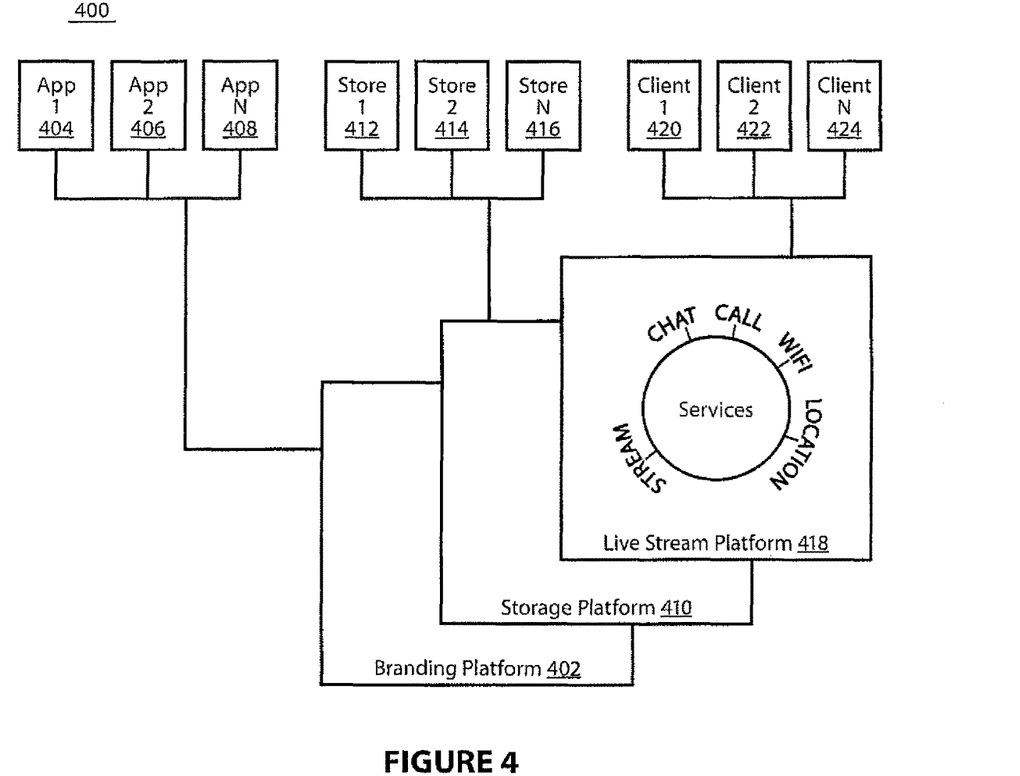
FIG. 4 is an exemplary application branding operation in accordance with at least one embodiment of the present invention.

As shown in FIG. 4, an exemplary operation diagram 400 is shown with respect to cross-platform, or multilayered, communication. In operation, the system may include architecture comprising three platforms: Branding Platform 402, Storage Platform 410, and Live Stream Platform 418.

Branding Platform, on the backend, may provide for the creation of a series of software applications (App-1 404, App-2 406, . . . App-N 408). Storage Platform 410 provides secure storage support at one or more remote or cloud storage locations (Store-1 412, Store-2 414, Store-N 416). An exemplary cloud storage solution such as LiveBox® or cloud storage via Amazon® Web Services. In other embodiments, local storage may be used, such as on a mobile device's local memory, or a combination of local memory, such as a cache, and remote storage. Elimination of local device storage enables unlimited duration of a live stream event. Live stream broadcasts may be recorded and stored on the cloud storage and made available for later viewing. Live Stream Platform 418 provides services for user-facing front-end applications (client-1 420, client-2 422, . . . client-N 424). Services may include, but is not limited to, Chat, Call, wireless networking (e.g., WiFi®), location, and stream (e.g., audio/video) services. Each platform may be configured to run different applications and may also be deployed amongst different regions, such as in China or in the United States.

Live Stream Platform 418 provides an application for mobile device users on a global scale. Mobile device users may watch live stream broadcasts made by other users or may start their own personal live broadcast. For the duration of the broadcast, the broadcasting user and/or viewers of the broadcast may make comments (e.g., text, audio, video) which may be overlaid the broadcasted video during the stream or displayed within close proximity of the broadcast, such as directly above, below, or the like. During playback of a live broadcast, original comments made by viewing users and the broadcasting user may be shown as originally displayed during the original live broadcast. During playback of a broadcast replay, users may also leave additional comments, such as text, audio, or video comments.

The mobile video messaging platform supports either private or public broadcasting via the application, as determined by the broadcasting user. A user may set up a personal channel that other users may subscribe to, as well as options to share and/or forward private broadcasts. The broadcasting user may also decide to subscribe to and therefore follow and view other broadcasting users within the application. Based on predetermined security settings or personal options, interactive chats during the live stream may be one-to-one, between closed groups, or an open chat room. A broadcasting user may also have a personal channel having a personal memo, such as a personal diary or journal visible only to the broadcasting user. Utilizing the cloud storage, the user's personal memo is accessible virtually anywhere a network connection is attainable. The user's personal memo may be a cloud-based personal mobile audio and video recorder allowing the recording of audio/video/text notes and may also include location information (i.e. based off of GPS coordinates) and/or timestamp information. Using location-based information, the live stream broadcast application may also provide real-time location data of other users. Based on this real-time location data, subscribed users may locate friends and/or family and may receive notifications when others enter/leave certain areas of interest. For example, a parent may be notified when a child leaves school or when the child arrives home.

Figure 5:
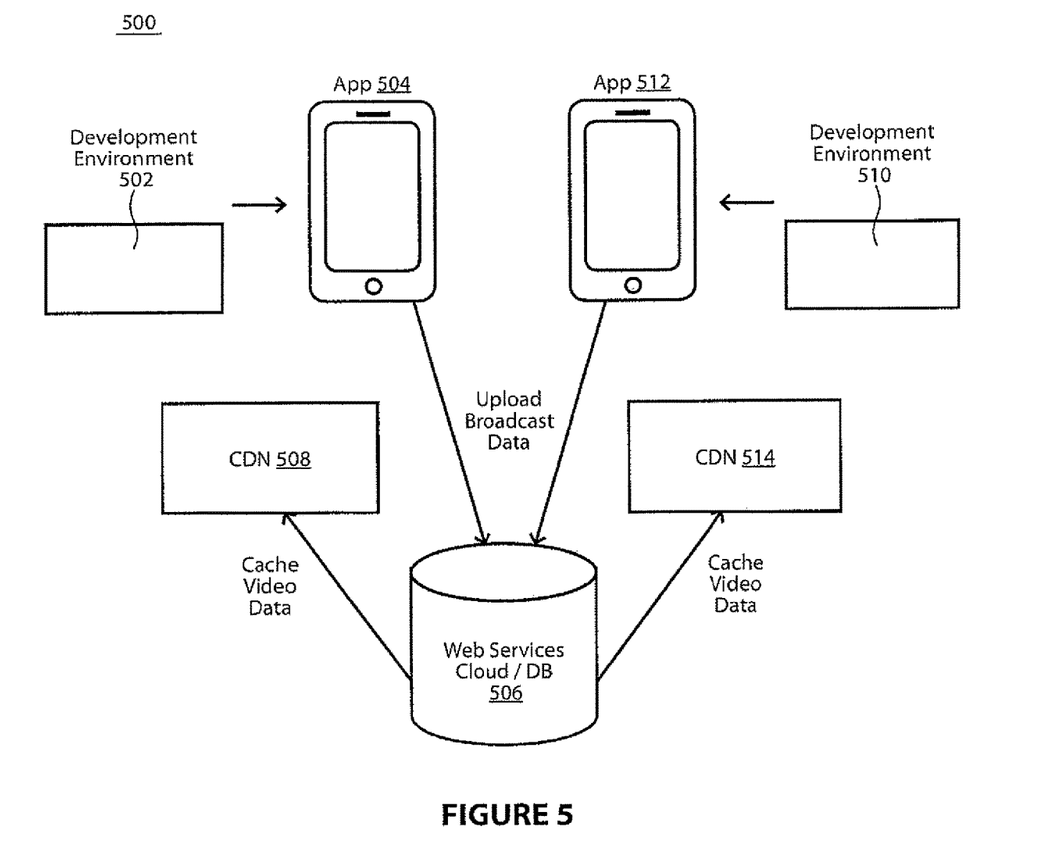
FIG. 5 is an exemplary ecosystem diagram of at least one embodiment of the present invention.

FIG. 5 is an exemplary ecosystem 500 of the application platform. The platform is intended to work across different mobile operating systems. For example, development environment 502 may generate apps intended to run within a first operating system on a device as App 504. A second development environment 510 may generate apps intended to run within a second operating system on another device as App 512. The operating systems may be any mobile operating system (e.g., iOS®, Android®, Windows Mobile®, Blackberry®, etc.) and it is understood that more than two may be of use. The utilization of only two in diagram 500 is merely for illustrative purposes only. While in use, and based on privacy settings, App 504 or App 512 may upload broadcast data or other data via a web services cloud/database 506 (e.g., Amazon Web Services®) to content delivery networks (CDN 508, CDN 514). Data stored at one or more CDN 508 or 514 may be made available cross-platform for later viewing based on permission and/or privacy levels. In one illustrative example, App 504 may be run on an iOS® device by a broadcast host whole App 512 may be run on an Android® device by a viewer. During a broadcast by App 504, the broadcast data may be uploaded to and cached to either CDN 508 or CDN 514 or both via web services cloud 506. The second user, via App 512, may view the live broadcast or view the broadcast at a later time or both via CDN 508 or CDN 514 via the web services cloud 506.

Figure 6:
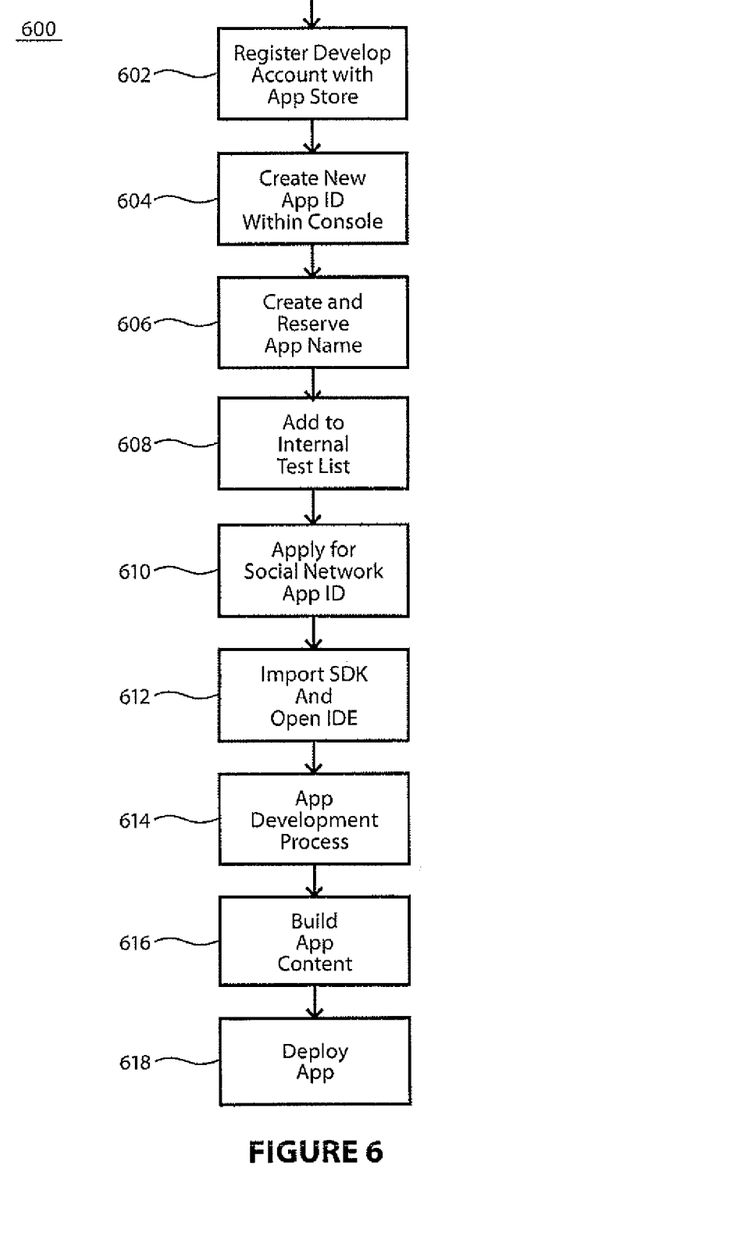
FIG. 6 is an exemplary workflow diagram of the present invention.

FIG. 6 is an exemplary workflow diagram 600 of an illustrative embodiment for the manufacturing and creation of applications, such as mobile apps, and the branding thereof by certain entities or groups. For example, the platform may be used to build a mobile live streaming app for a law firm to be used in-house. The app may provide a real-time live chat feature for employees of the firm, as well as features to live broadcast by the firm to promote legal services to prospective clients. In another non-limiting example, the platform may be used to build a mobile live-streaming app customized for a celebrity entertainment news anchor. The platform would brand the app based on the celebrity news anchor's likeness and would provide features such as interviews with movie stars, movie commentary, press releases, or the like. In another non-limiting example, the platform may be used to build a live streaming app for a media company with a certain target audience, such as recent college graduates seeking internship and/or practical training opportunities worldwide. In this example, the platform would be customized to allow job seekers using the app to post video resumes and employers using the app to live broadcast for internships and/or practical training opportunities they are offering. In another non-limiting example, the platform may be used to build a cloud-based mobile live streaming app for a security management company. The company, via the app, would allow users to watch and attend live broadcast sessions, seminars, and other types of events, as well as be involved in official chat rooms or Q&A sessions. Further, certain leaders within the company may hold meetings or events to allow remote users to fully engage and interact via text, video, and/or audio. Live broadcasts of meetings, sessions, or otherwise, may be made available for later viewing by users of the application.

Turning to FIG. 6, in step 602, the automation platform console registers a developer account with an app store (e.g., iOS®, Android®, etc.). Once registered, a new App ID may be created within the console, step 604. In step 606, the console may create and reserve a name for the application based on user inputs. In step 608, the application being developed may be added to a software testing list. The testing of the mobile application may be tested via an online service, such as TestFlight® or the like once the mobile application is fully developed. In step 610, the console may apply for one or more social network application IDs (e.g., Facebook®, Google®, WeChat®). In step 612, the console may import appropriate software development kits ("SDK") and/or an integrated development environment ("IDE"), as needed. In step 614, the application development process is performed. An app may be developed based on inputs received from a user (e.g., app name, app use, data model, features needed, database, etc.). The inputs may be organized and stored as metadata (i.e. an XML file) or a flat file. In step 616, the app may be built and tested. Once ready, the app may be deployed in appropriate app stores (e.g., Apple or Android App Stores, or the like) in step 618.

It is appreciated that exemplary computing system 200 is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

We claim:

1. A customized mobile application creation platform for the creation and branding of new customized mobile applications within a mobile application ecosystem, the customized mobile application creation platform comprising:
   a hardware processor; and
   a non-transitory computer readable storage medium having instructions stored thereon that, when executed by the hardware processor, are configured to implement:
      a branding platform configured to:
         create and brand one or more new customized mobile applications made available within the mobile application ecosystem, wherein each of the one or more new customized mobile applications within the mobile application ecosystem include a live broadcast module, a real-time location module, an interactive chat module, and a content monetization module;
      a storage platform configured to:
         provide one or more storage locations for each of the one or more new customized mobile applications within the mobile application ecosystem including the live broadcast module, the real-time location module, the interactive chat module, and the content monetization module;
      a live stream platform configured to:
         implement one or more live stream services for each of the one or more new customized mobile applications within the mobile application ecosystem including the live broadcast module, the real-time location module, the interactive chat module, and the content monetization module; and
      a mobile video messaging platform configured to:
         implement one or more mobile video messaging services for each of the one or more new customized mobile applications within the mobile application ecosystem including the live broadcast module, the real-time location module, the interactive chat module, and the content monetization module.

2. The customized mobile application creation platform of claim 1, wherein the branding platform is further configured to:
   brand each of the one or more new customized mobile applications within the mobile application ecosystem including the live broadcast module, the real-time location module, the interactive chat module, and the content monetization module based on one or more parameters associated with an entity.

3. The customized mobile application creation platform of claim 2, wherein the entity is a business entity.

4. The customized mobile application creation platform of claim 2, wherein the entity is an association entity.

5. The customized mobile application creation platform of claim 2, wherein the entity is an organization entity.

6. The customized mobile application creation platform of claim 2, wherein the entity is a cooperative entity.

7. The customized mobile application creation platform of claim 2, wherein the entity is a governmental entity.

8. The customized mobile application creation platform of claim 1, wherein the storage platform is further configured to:
   store data associated with a live stream event.

9. The customized mobile application creation platform of claim 1, wherein the one or more live stream services comprise at least one or more of chat, wireless networking, location-based services, and streaming services.

10. The customized mobile application creation platform of claim 1, wherein the live stream platform is further configured to:
    interface with one or more users.

11. A method for implementing a customized mobile application creation platform for the creation and branding of new customized mobile applications within a mobile application ecosystem, the method comprising:
    creating and branding one or more new customized mobile applications made available within the mobile application ecosystem, wherein each of the one or more new customized mobile applications within the mobile application ecosystem include a live broadcast module, a real-time location module, an interactive chat module, and a content monetization module;
    providing one or more storage locations for each of the one or more new customized mobile applications within the mobile application ecosystem including the live broadcast module, the real-time location module, the interactive chat module, and the content monetization module;
    implementing one or more live stream services for each of the one or more new customized mobile applications within the mobile application ecosystem including the live broadcast module, the real-time location module, the interactive chat module, and the content monetization module; and implementing one or more mobile video messaging services for each of the one or more new customized mobile applications within the mobile application ecosystem including the live broadcast module, the real-time location module, the interactive chat module, and the content monetization module.

12. The method of claim 11, wherein creating further comprises:

branding each of the one or more new customized mobile applications within the mobile application ecosystem including the live broadcast module, the real-time location module, the interactive chat module, and the content monetization module based on one or more parameters associated with an entity.

13. The method of claim 12, wherein the entity is a business entity.

14. The method of claim 12, wherein the entity is an association entity.

15. The method of claim 12, wherein the entity is an organization entity.

16. The method of claim 12, wherein the entity is a cooperative entity.

17. The method of claim 12, wherein the entity is a governmental entity.

18. The method of claim 11, wherein providing further comprises:

storing data associated with a live stream event.

19. The method of claim 11, wherein the one or more live stream services comprise at least one or more of chat, wireless networking, location-based services, and streaming services.

20. The method of claim 11, wherein implementing one or more live stream services further comprises:

interfacing with one or more users.

* * * * *